(12) United States Patent
Sonoda et al.

(10) Patent No.: US 9,469,789 B2
(45) Date of Patent: *Oct. 18, 2016

(54) LAMINATED FILM (71) Applicant: Toray Industries, Inc., Tokyo (JP)

(72) Inventors: Kazumori Sonoda, Otsu (JP); Syunichi Osada, Otsu (JP); Takashi Mimura, Otsu (JP); Yoshihiro Masuda, Otsu (JP); Norifumi Miwa, Otsu (JP); Takayoshi Kirimoto, Fukushima (JP); Ippei Ozeki, Fukushima (JP)

(73) Assignee: Toray Industries, Inc. (JP)

( * ) Notice: Subject to any disclaimer, the term of this patent is extended or adjusted under 35 U.S.C. 154(b) by 60 days.

This patent is subject to a terminal disclaimer.

(21) Appl. No.: 14/358,768

(22) PCT Filed: Dec. 14, 2012

(86) PCT No.: PCT/JP2012/082509
§ 371 (c)(1),
(2) Date: May 16, 2014

(87) PCT Pub. No.: WO2013/094532
PCT Pub. Date: Jun. 27, 2013

(65) Prior Publication Data
US 2014/0303316 A1 Oct. 9, 2014

(30) Foreign Application Priority Data
Dec. 21, 2011 (JP) .................. 2011-279465

(51) Int. Cl.
| B32B 27/40 | (2006.01) |
| B32B 27/08 | (2006.01) |
| B32B 27/36 | (2006.01) |
| C08L 75/04 | (2006.01) |
| C08L 83/04 | (2006.01) |
| C08G 18/61 | (2006.01) |
| C08J 7/04 | (2006.01) |
| C09J 9/00 | (2006.01) |
| C08F 299/06 | (2006.01) |
| C08F 2/50 | (2006.01) |

(52) U.S. Cl.
CPC .. C09J 9/00 (2013.01); C08F 2/50 (2013.01); C08F 299/065 (2013.01); C08J 7/047 (2013.01); C08J 2475/16 (2013.01)

(58) Field of Classification Search
CPC ........ C09J 9/00; C09J 175/06; C09J 183/04; C09J 183/10; C08L 75/06; C08L 183/04; C08L 183/10; C08G 18/4277; C08G 77/445; C08F 2/50; C08F 299/065; C08J 7/042; C08J 7/047; C08J 2470/04; C08J 2470/16; C08J 2483/04; B32B 27/08; B32B 27/36; B32B 27/40; B32B 27/283; B32B 2250/24; B32B 2307/518; Y10T 428/265; Y10T 428/31786; Y10T 428/31565; Y10T 428/31613; Y10T 428/31616
USPC .................. 428/423.1, 423.7, 430, 447, 480; 528/33, 85, 367

See application file for complete search history.

(56) References Cited

U.S. PATENT DOCUMENTS

| 4,227,979 A * | 10/1980 | Humke et al. .................. 522/14 |
| 4,762,887 A * | 8/1988 | Griswold et al. ............... 522/99 |
| 8,980,432 B2 * | 3/2015 | Sonoda et al. ............. 428/423.7 |
| 2008/0085947 A1* | 4/2008 | Ward et al. ..................... 522/42 |
| 2014/0171598 A1* | 6/2014 | Masuda et al. ............... 525/450 |

FOREIGN PATENT DOCUMENTS

| JP | 6-81822 B2 | 10/1994 |
| JP | 2001-002744 A | 1/2001 |
| JP | 2003-014906 A | 1/2003 |
| JP | 2003-302501 A | 10/2003 |
| JP | 2004-244426 A | 9/2004 |
| JP | 3676260 B2 | 5/2005 |
| JP | 2005-162908 A | 6/2005 |
| JP | 2006-137780 A | 6/2006 |
| JP | 2007-009218 A | 1/2007 |
| JP | 3926461 B2 | 3/2007 |
| WO | 2011/136042 A1 | 11/2011 |

* cited by examiner

Primary Examiner — Thao T Tran
(74) Attorney, Agent, or Firm — DLA Piper LLP (US)

(57) ABSTRACT

A laminated film has a layer (A) on at least one side of a base film, wherein resin contained in the layer (A) has (1) a (poly)caprolactone segment and (2) a urethane bond and, in measurement using a micro hardness tester, a maximum displacement amount in a thickness direction of the layer (A) is 1.0 to 3.0 μm and a creep displacement amount in the thickness direction of the layer (A) is 0.2 to 0.5 μm when a load of 0.5 mN is applied for 10 seconds, and a permanent displacement amount in the thickness direction of the layer (A) is 0.3 to 0.65 μm when the load is released to 0 mN.

9 Claims, 1 Drawing Sheet

LAMINATED FILM

TECHNICAL FIELD

This disclosure relates to a laminated film that has, as a molding material, excellent molding conformability, scratch resistance, and adhesion to a resin substrate and is also advantageous in terms of productivity and cost, and also relates to a laminated film that can be suitably used for decoration molding.

BACKGROUND

On a material for molding like decoration molding, a surface hardening layer is formed to prevent scratches during molding or scratches while using the product after molding. However, since the surface hardening layer has insufficient elongation which conforms to molding, a crack is generated during molding, or in an extreme case, the film is broken and the surface hardening layer is peeled off. For such reasons, a means to form a surface hardening layer after molding, performing full curing by heating or irradiating with active rays after molding under a semi-cured state, or the like is generally employed. However, since the product after molding is processed to have a three-dimensional shape, it is extremely difficult to form a surface hardening layer by post processing. Further, when molding is carried out in a semi-cured state, contamination of a mold may be caused depending on molding conditions. Thus, an anti-abrasion material having conformability to molding has been desired and a "self-healing material," which can restore a minor scratch rather than increasing hardness to prevent scratching, has recently been getting an attention (WO 2011/136042 and Japan Patent No. 3926461). The self-healing material can restore deformation within a range of elastic recovery by itself, and two major types including a thermosetting type and an active energy ray curing type using UV ray or electronic ray are known.

The thermosetting type materials disclosed in WO '042 and JP '461 are good in moldability and self-healing property, but poor in contamination resistance and, therefore, they problematically cause various problems on contact with fingers with cosmetics or resin bags containing plasticizers. The contamination as referred to herein is a problem that causes color formation or maculae due to permeation of a plasticizer (e.g., dioctyl phthalate) contained in a polyvinyl chloride sheet, cosmetics, ink components of permanent markers, and the like into a self-healing material, and it cannot be eliminated by just wiping a surface thereof.

On the other hand, the ultraviolet curing type self-healing materials disclosed in JP-A 2001-2744 and Japan Patent No. 3676260 are relatively excellent in contamination resistance, but poor in self-healing property, and materials of this type capable of satisfying both of the properties have not been obtained yet.

It could therefore be helpful to provide a laminated film that has a self-healing layer excellent in self-healing property and contamination resistance.

SUMMARY

We provide a laminated film having a layer (A) on at least one side of a base film, wherein resin contained in the layer (A) has (1) a (poly)caprolactone segment and (2) a urethane bond, and, in measurement using a micro hardness tester, the maximum displacement amount in the thickness direction of the layer (A) is 1.0 to 3.0 μm and the creep displacement amount in the thickness direction of the layer (A) is 0.2 to 0.5 μm when a load of 0.5 mN is applied for 10 seconds, and the permanent displacement amount in the thickness direction of the layer (A) is 0.3 to 0.65 μm when the load is released to 0 mN.

The laminated film functions to repair scratches on a surface (self-healing property) and has excellent contamination resistance. Therefore, the laminated film is useful especially when using a film likely to suffer from surface scratch generation as a base film.

DESCRIPTION OF REFERENCE SIGNS

1 Loading
2 Keeping
3 Unloading
a Maximum displacement amount
b Creep displacement amount
c Permanent displacement amount

DETAILED DESCRIPTION

Our laminated films are described in more detail below.
Base Film

The resin constituting our base film may be any of a thermoplastic resin and a thermosetting resin, and it may also be a homoresin, a copolymer resin or a blend of two or more kinds. More preferably, the resin constituting the base film is a thermoplastic resin because of its good moldability.

Examples of the thermoplastic resin include polyolefin resins such as polyethylene, polypropylene, polystyrene and polymethylpentene, alicyclic polyolefin resins, polyamide resins such as nylon 6 and nylon 66, aramid resins, polyester resins, polycarbonate resins, polyarylate resins, polyacetal resins, polyphenylene sulfide resins, fluorine resins such as ethylene tetrafluoride resin, ethylene trifluoride resin, ethylene trifluoride chloride resin, an ethylene tetrafluoride-propylene hexafluoride copolymer and vinylidene fluoride resin, acryl resins, methacryl resins, polyacetal resins, polyglycolic acid resins and polylactic acid resins. As the thermoplastic resin, a resin having both sufficient elongation property and conformability is preferable. Among them, from the viewpoint of strength, heat resistance and transparency, the polyester resin is particularly preferable.

The polyester resin is a general name of a polymer in which an ester bond is a major bonding chain in the main skeleton, and the polymer is obtained by polycondensation of an acid component and an ester thereof and a diol component. Specific examples thereof include polyethylene terephthalate, polypropylene terephthalate, polyethylene-2,6-naphthalate, and polybutylene terephthalate. Further, a copolymer obtained by copolymerization with them and other dicarboxylic acid and an ester thereof or other diol component as an acid component or a diol component may also be used. Among them, from the viewpoints of transparency, dimension stability, heat resistance, and the like, polyethylene terephthalate and polyethylene-2,6-naphthalate are particularly preferable.

The polyester resin is the general name of a polymer in which ester bond is a major bonding chain in the main skeleton, and the polymer is obtained by polycondensation of an acid component and an ester thereof and a diol component. Specific examples thereof include polyethylene terephthalate, polypropylene terephthalate, polyethylene-2,6-naphthalate, and polybutylene terephthalate. Further, a copolymer obtained by copolymerization with them and other dicarboxylic acid and an ester thereof or other diol component as an acid component or a diol component may also be used. Among them, from the viewpoint of transparency, dimension stability, heat resistance, and the like, polyethylene terephthalate and polyethylene-2,6-naphthalate are particularly preferable.

Further, various additives may be added to the base film, for example, an antioxidant, an antistatic agent, a crystalline nucleating agent, an inorganic particle, an organic particle, a viscosity reducing agent, a heat stabilizer, a lubricant, an infrared absorbing agent, an ultraviolet absorbing agent, and a doping agent to adjust refractive index.

The base film may be any of a base film with monolayer constitution and a base film with multilayer constitution.

Polyester Base Film

When the resin constituting a base film contains a polyester resin in an amount of 50% by mass or more and 100% by mass or less in 100% by mass of the entire components of the base film, such a base film is referred to as a polyester base film.

With respect to the polyester resin constituting the polyester base film, the intrinsic viscosity of the polyester is preferably 0.4 to 1.2 dl/g, and more preferably 0.5 to 0.8 dl/g (as measured in o-chlorophenol at 25° C. according to JIS K 7367 (2000)).

As the polyester base film, any of a non-stretched (non-oriented) film, a monoaxially stretched (monoaxially oriented) film, and a biaxially stretched (biaxially oriented) film may be used. However, a biaxially stretched film having excellent dimension stability or heat resistance is preferably used. It is preferable that the biaxially stretched film has high crystal orientation. A biaxially oriented film refers to a film that shows a biaxially oriented pattern in wide angle X-ray diffraction observation.

The polyester base film may be a polyester film having fine cavities within it.

The polyester base film may have a monolayer constitution or a multilayer constitution.

For a polyester base film having a multilayer constitution, different polyester resins, preferably a layer containing polyester resin C in an amount of 50% by mass to 100% by mass (layer (C)) and a layer containing polyester resin D in an amount of 50% by mass to 100% by mass (layer (D)) are laminated. When the polyester base film has a multilayer constitution, the expression "different polyester resins" includes not only polyester resins having a different molecular structure but also polyester resins in which only a part of a copolymerized polyester resin is different.

Laminated Film Having Layer (A)

A laminated film having a layer (A) on at least one side of a base film is described below.

The laminated film has a layer (A) on at least one side of a base film, wherein the resin contained in the layer (A) has (1) a (poly)caprolactone segment and (2) a urethane bond, and, in measurement using a micro hardness tester, the maximum displacement amount in the thickness direction of the layer (A) is 1.0 to 3.0 μm and the creep displacement amount in the thickness direction of the layer (A) is 0.2 to 0.5 μm when a load of 0.5 mN is applied for 10 seconds, and the permanent displacement amount in the thickness direction of the layer (A) is 0.3 to 0.65 μm when the load is released to 0 mN.

The laminated film has an excellent effect in self-healing property because of its possession of the layer (A) on at least one side of the base film.

While the layer (A) can be provided on both sides of the base film, it is preferably present on only one side of the base film in view of cost while depending on the application of the film. This is because in many applications, a laminated film is allowed to have sufficient self-healing property just by the presence of the layer (A) on one side of the base film.

It is important for the resin contained in the layer (A) to have (1) a (poly)caprolactone segment and (2) a urethane bond. Moreover, the layer (A) can also contain a resin having (1) a (poly)caprolactone segment and (2) a urethane bond and can also contain a plurality of resins, namely, a resin having (1) a (poly)caprolactone segment and a resin having (2) a urethane bond. Components that are included in the layer (A) are described below.

(Poly)Caprolactone Segment

The layer (A) has (1) a (poly)caprolactone segment. As the layer (A) has a (poly)caprolactone segment, an elasticity recovering property (that is, self-healing property) can be given to the layer (A).

The (poly)caprolactone segment refers to a segment represented by Formula (1):

n is an integer of 1 to 35.

When the layer (A) is formed by using a composition including a resin that contains a (poly)caprolactone segment, the layer (A) can have a (poly)caprolactone segment. The resin containing a (poly)caprolactone segment preferably has at least one or more hydroxyl groups. The hydroxyl group is preferably located at an end of a resin containing a (poly)caprolactone segment.

When the layer (A) has a component having a (poly)caprolactone segment, the layer (A) can have a self-healing property. In other words, even when a scratch is formed on the surface of the layer (A), the scratch can be removed (that is, self-healed) within a short time such as several seconds.

Particularly preferred examples of the resin containing a (poly)caprolactone segment include a (poly)caprolactone having 2 to 3 functional hydroxyl groups. Specifically, there can be used a radically polymerizable polycaprolactone such as a (poly)caprolactone diol m+n is an integer of 4 to 35,

R: $C_2H_4$, $C_2H_4OC_2H_4$, $C(CH_3)_2(CH_2)_2$ a (poly)caprolactone triol and (3)

1+m+n is an integer of 3 to 30.
R: $CH_2CHCH_2$, $CH_3C(CH_2)_3$, $CH_3CH_2C(CH_2)_3$
a (poly)caprolactone-modified hydroxyethyl(meth)acrylate.

(4)

R: H or $CH_3$, an integer of n: 1 to 25.

Radical polymerizability is such a property that crosslinking proceeds due to active energy rays, and compounds having a functional group (CH2=) of an acrylate group are included.

Examples of other radically polymerizable caprolactones include a (poly)caprolactone-modified hydroxypropyl (meth)acrylate and a (poly)caprolactone-modified hydroxybutyl(meth)acrylate.

Further, the resin containing a (poly)caprolactone segment may contain (or be copolymerized with) an additional segment or an additional monomer in addition to the (poly) caprolactone segment. For example, a polydimethylsiloxane segment or a (poly)siloxane segment may be contained (or copolymerized).

Further, the weight average molecular weight of the (poly)caprolactone segment in the resin containing a (poly) caprolactone segment is preferably 500 to 2,500. More preferably, the weight average molecular weight is 1,000 to 1,500. When the weight average molecular weight of the (poly)caprolactone segment is 500 to 2,500, the effect of self-healing property is further exhibited and scratch resistance is further improved.

When the (poly)caprolactone segment is copolymerized, or when the segment is added separately, it is preferred in self-healing property and contamination resistance that the (poly)caprolactone segment accounts for 5 to 50% by mass in 100% by mass of the entire components in the composition to be used for forming the layer (A). As used herein, 100% by mass of the entire components in the composition do not include a solvent which is not involved with the reaction. The monomer component involved with the reaction is included therein.

Urethane Bond

The resin contained in the layer (A) has (2) a urethane bond.

Inclusion of a commercially available urethane-modified resin in the composition to be used to form the layer (A) allows the resin contained in the layer (A) to have a urethane bond. Further, generation of a urethane bond by allowing an isocyanate group to react with a hydroxyl group when forming the layer (A) also allows the resin contained in the layer (A) to have a urethane bond.

The resin contained in the layer (A) preferably has a urethane bond as a result of generation of a urethane bond by allowing an isocyanate group to react with a hydroxyl group. As a result of generating a urethane bond based on a reaction between an isocyanate group and a hydroxyl group, not only the toughness of the layer (A) is improved but also the elasticity recovering property (self-healing property) of the layer (A) can be improved.

Further, when a resin containing a polysiloxane segment or a resin containing a polydimethylsiloxane segment has a hydroxyl group, it is possible to generate a urethane bond between the resin and a compound having an isocyanate group by an action of heat or the like. It is preferred to form the layer (A) by using a compound containing an isocyanate group and a resin containing a (poly)siloxane segment having a hydroxyl group or a resin containing a polydimethylsiloxane segment having a hydroxyl group because the toughness, the elasticity recovering property (self-healing property), and the surface lubricity of the layer (A) can be thereby improved.

The compound containing an isocyanate group indicates a resin containing an isocyanate group or a monomer or an oligomer containing an isocyanate group. Examples of the compound containing an isocyanate group include polyisocyanates such as methylenebis-4-cyclohex-ylisocyanate, a trimethylol propane adduct of tolylene diisocyanate, a trimethylol propane adduct of hexamethylene diisocyanate, a trimethylol propane adduct of isophorone diisocyanate, an isocyanurate form of tolylene diisocyanate, an isocyanurate form of hexamethylene diisocyanate and a biuret form of hexamethylene isocyanate, and a block form of the isocyanates.

Among the compounds containing an isocyanate group, an aliphatic isocyanate is preferred compared to an alicyclic or aromatic isocyanate as it has a higher self-healing property. More preferred example of the compound containing an isocyanate group is hexamethylene diisocyanate. Further, as the compound containing an isocyanate group, isocyanate having an isocyanurate ring is particularly preferred from the viewpoint of heat resistance. The isocyanurate form of hexamethylene diisocyanate is most preferred. The isocyanate having an isocyanurate ring forms the layer (A) having both the self-healing property and heat resistance.

In the composition to be used to form the layer (A), an additional crosslinking agent, e.g., a melamine crosslinking agent such as an alkoxymethylol melamine, an acid anhydride-based crosslinking agent such as 3-methyl-hexahydrophthalic anhydride, and an amine-based crosslinking agent such as diethylaminopropylamine may also be contained. If necessary, a crosslinking catalyst such as dibutyl tin dilaurate and dibutyl tin diethyl hexoate may also be used to promote the reaction to form a urethane bond.

(Poly)Alkylene Glycol Segment

The layer (A) preferably has (3) a (poly)alkylene glycol segment. The (poly)alkylene glycol segment refers to a segment represented by Formula (5):

(5)

n is an integer of 2 to 4.
m is an integer of 2 to 11.

It is noted that n is an integer of 2 to 4 and m is an integer of 2 to 11.

As described above, the alkylene glycol is a glycol the number n of the carbon atoms of which is 2 to 4. Moreover, the number m of the repeating units of the alkylene glycol is 2 to 11, preferably 3 to 6. When the number n of the carbon atoms of the alkylene glycol is more than 4 or when the number of the repeating units of the alkylene glycol is more than 11, the molecular chain of the alkylene glycol is longer to afford a lowered crosslinking density of a cured product, which comes to have a lowered hardness, resulting in decreases in coating film strength, scratch resistance, and the like. On the other hand, when the number m of the repeating units of the alkylene glycol is less than 2, a cured product deteriorates in self-healing property and also in processability.

Formation of the layer (A) using a composition including a resin containing a (poly)alkylene glycol segment allows the layer (A) to have a (poly)alkylene glycol segment.

The resin containing a (poly)alkylene glycol segment preferably has at least one or more hydroxyl groups. The hydroxyl group is preferably present at an end of the resin containing a (poly)alkylene glycol segment.

The resin containing a (poly)alkylene glycol segment is preferably a (poly)alkylene glycol(meth)acrylate having an acrylate group at an end thereof to impart elasticity. Although the (poly)alkylene glycol(meth)acrylate is not limited with respect to the number of the acrylate functional groups (or methacrylate functional groups), it is most preferred to be monofunctional from the viewpoint of the self-healing property of a cured product.

Examples of the (poly)alkylene glycol(meth)acrylate contained in the composition to be used to form the layer (A) include (poly)ethylene glycol(meth)acrylate, (poly)propylene glycol(meth)acrylate, and (poly)butylene glycol(meth)acrylate. These are represented by the following formulae, respectively:

(Poly)ethylene glycol(meth)acrylate:

$$CH_2=CRCOO(C_2H_4O)_mH$$

(Poly)propylene glycol(meth)acrylate:

$$CH_2=CRCOO(CH_2CH_2CH_2O)_mH$$

The hydroxyl group of the (poly)propylene glycol(meth)acrylate is a primary hydroxyl group, i.e., a hydroxyl group attached to primary carbon.

(Poly)butylene glycol(meth)acrylate:

$$CH_2=CRCOO(C_4H_8O)_mH$$

It is noted that R is hydrogen (H) or a methyl group ($-CH_3$), and m is an integer of 2 to 11.

Among these polyalkylene glycol(meth)acrylates, (poly)ethylene glycol(meth)acrylate, which is derived from ethylene glycol, is preferred. The (poly)ethylene glycol(meth)acrylate can contribute to satisfy both of the cosmetics resistance and the scratch resistance of a cured product to be obtained because the number n of the carbon atoms in Formula (5) is the smallest.

It is preferred to allow the above-described compound containing an isocyanate group and a hydroxyl group of a (poly)alkylene glycol(meth)acrylate to react with each other, thereby forming urethane(meth)acrylate, and use the urethane(meth)acrylate for the layer (A) because the layer (A) is thereby allowed to have (2) a urethane bond and (3) a (poly)alkylene glycol segment so that the toughness of the layer (A) can be improved and the self-healing property can also be improved.

In the above-described urethanization reaction of the compound containing an isocyanate group with the (poly)alkylene glycol(meth)acrylate, a hydroxyalkyl(meth)acrylate, a long chain alcohol, and the like may be blended. Blending a hydroxyalkyl(meth)acrylate can improve the hardness of the layer (A), which is a cured product. Blending a long chain alcohol can improve the surface lubricity of the layer (A), which is a cured product, and thereby can improve the scratch resistance. The long chain alcohol is a compound included in the concept of the above-described long chain alkyl group-containing compound.

Examples of the hydroxyalkyl(meth)acrylate, which is to be blended at the same time as the urethanization reaction of the compound containing an isocyanate group with the (poly)alkylene glycol(meth)acrylate, include hydroxyethyl (meth)acrylate, hydroxypropyl(meth)acrylate, and hydroxybutyl(meth)acrylate.

Examples of the long chain alcohol, which is to be blended at the same time as the urethanization reaction of the compound containing an isocyanate group with the (poly)alkylene glycol(meth)acrylate, include tridecanol, myristyl alcohol, cetyl alcohol, stearyl alcohol, behenyl alcohol, polyoxyethylene monostearate, polyoxyethylene cetyl ether, polyoxyethylene stearyl ether, and glycerol monostearate. Examples of particularly preferable long chain alcohols include polyether-modified long chain alcohols such as polyether-modified cetyl alcohol. It is because the use of a polyether-modified long chain alcohol can give an antistatic effect to the layer (A), which is a cured product.

The above-described urethanization reaction of the compound containing an isocyanate group with the (poly)alkylene glycol(meth)acrylate is performed in the presence of a catalyst, a polymerization inhibitor, and the like in an organic solvent. The reaction temperature in the urethanization reaction is preferably from room temperature to 100° C. and the reaction time is preferably from 1 to 10 hours. When the reaction temperature is lower than room temperature or when the reaction time is shorter than 1 hour, the process of the reaction is slow and the desired urethane (meth)acrylate is easier to lower in yield. Conversely, when the reaction temperature exceeds 100° C. or when the reaction time is longer than 10 hours, there is a tendency that side reactions occur easily.

Examples of the organic solvent to be used for the above-described urethanization reaction of the compound containing an isocyanate group with the (poly)alkylene glycol(meth)acrylate include aromatic hydrocarbon solvents such as toluene and xylene; ketone solvents such as acetone, methyl ethyl ketone, methyl isobutyl ketone and cyclohexanone; and ester solvents such as ethyl acetate, propyl acetate, isobutyl acetate and butyl acetate. Examples of the catalyst include dibutyltin laurate, dibutyltin diethylhexoate, and dibutyltin sulfite. Examples of the polymerization inhibitor include hydroquinone monomethyl ether.

(Poly)Siloxane Segment

The layer (A) preferably contains (4) a (poly)siloxane segment and/or a polydimethylsiloxane segment. The (poly) siloxane segment refers to a segment represented by the following chemical formula. In Formula (6), R is either OH or an alkyl group having 1 to 8 carbon atoms, and the formula includes at least one hydrogen and at least one such alkyl group:

(6)

R is OH or an alkyl group having 1 to 8 carbon atoms, and n is an integer of 3 to 100.

Inclusion of a resin containing a (poly)siloxane segment in the composition to be used to form the layer (A) allows the layer (A) to have a (poly)siloxane segment and/or a polydimethylsiloxane segment.

A partial hydrolysate of a silane compound containing a hydrolyzable silyl group, organosilica sol, or organosilica sol to which a hydrolyzable silane compound having a radical polymer is added can be used as the resin containing a polysiloxane segment.

Examples of the resin containing a (poly)siloxane segment include complete or partial hydrolysates of silane compounds having hydrolyzable silyl groups such as a tetraalkoxysilane, a methyltrialkoxysilane, a dimethyldialkoxysilane, a γ-glycidoxypropyltrialkoxysilane, a γ-glycid-oxypropylalkyldialkoxysilane, a γ-methacryloxypropyltrialkoxysilane and a γ-methacryloxypropylalkyldialkoxysilane, organosilica sol dispersed in an organic solvent, and a product prepared by adding a hydrolyzable silane compound having a hydrolyzable silyl group to the surface of an organosilica sol.

Further, the resin containing a (poly)siloxane segment may contain (or, be copolymerized with) a segment which is different from the (poly)siloxane segment. For example, a monomer component having a (poly)caprolactone segment or a polydimethylsiloxane segment may be contained (or, copolymerized).

A copolymer of monomers having a hydroxy group capable of reacting with an isocyanate group is preferably used as the resin containing a (poly)siloxane segment. Copolymerization of monomers having a hydroxy group capable of reacting with an isocyanate group with the resin containing a (poly)siloxane segment allows the layer (A) to have improved toughness.

When the resin containing a (poly)siloxane segment is a copolymer having a hydroxyl group, if a layer (A) is formed using a composition containing a resin (copolymer) containing a (poly)siloxane segment having a hydroxy group and a compound containing an isocyanate group, a layer (A) having a (poly)siloxane segment and a urethane bond can be formed efficiently.

Either in the case that a (poly)siloxane segment is copolymerized or in the case that a (poly)siloxane segment is added separately, the (poly)siloxane segment preferably accounts for 1 to 20% by mass in 100% by weight of all the components of the composition to be used for forming the layer (A) in terms of self-healing property, contamination resistance, weather resistance, and heat resistance. As used herein, 100% by mass of the entire components in the composition do not include a solvent which is not involved with the reaction. The monomer component involved with the reaction is included therein.

Polydimethylsiloxane Segment

The polydimethylsiloxane segment indicates a segment represented by Formula (7):

(7)

m is an integer of 10 to 300.

When the layer (A) contains a polydimethylsiloxane segment, the polydimethylsiloxane segment is coordinated to the surface of the layer (A). As a result of coordination of the polydimethylsiloxane segment to the surface of the layer (A), a lubricating property of the surface of the layer (A) is enhanced so that the friction resistance can be lowered. As a result, a property of having a scratch can be inhibited.

The layer (A) can have a (poly)siloxane segment and/or a polydimethylsiloxane segment by inclusion of a resin containing a polydimethylsiloxane segment in the composition to be used for forming the layer (A). Preferred examples of the resin containing a polydimethylsiloxane segment include a copolymer obtained by copolymerizing a vinyl monomer with a polydimethylsiloxane segment.

For the purpose of enhancing the toughness of the layer (A), it is preferred that a monomer having a hydroxyl group capable of reacting with an isocyanate group is copolymerized in the resin containing a polydimethylsiloxane segment. When the resin containing a polydimethylsiloxane segment is a copolymer having a hydroxyl group, if a layer (A) is formed using a composition including a resin (copolymer) containing a polydimethylsiloxane segment having a hydroxy group and a compound containing an isocyanate group, a layer (A) having a polydimethylsiloxane segment and a urethane bond can be formed efficiently.

When the resin containing a polydimethylsiloxane segment is a copolymer with a vinyl monomer, it may be any of a block copolymer, a graft copolymer, and a random copolymer. When the resin containing a polydimethylsiloxane segment is a copolymer with a vinyl monomer, it is referred to as a polydimethylsiloxane-based copolymer. The polydimethylsiloxane-based copolymer can be produced according to a living polymerization method, a polymer initiator method, or a polymer chain transfer method or the like. However, considering productivity, the polymer initiation method and the polymer chain transfer method are preferably used.

When the polymer initiator method is used, another vinyl monomer can be copolymerized using a polymer azo-based radical polymerization initiator represented by Formula (8):

(8)

m is an integer of 10 to 300 and n is an integer of 1 to 50.

Further, it is also possible to perform two-step polymerization including synthesizing a prepolymer having a peroxide group introduced into a side chain by low temperature copolymerization of a peroxy monomer and polydimethylsiloxane having an unsaturated group, and copolymerizing the prepolymer with a vinyl monomer.

When the polymer chain transfer method is used, a block copolymer can be synthesized by adding HS—CH$_2$COOH, HS—CH$_2$CH$_2$COOH, or the like to silicone oil represented by Formula (9) to form a compound having an SH group, and then copolymerizing the silicone compound and a vinyl monomer utilizing chain transfer of an SH group:

(9)

m is an integer of 10 to 300.

To synthesize a polydimethylsiloxane-based graft copolymer, the graft copolymer can be obtained easily by copolymerizing, for example, a compound represented by Formula (10), that is, polydimethylsiloxane methacrylate, with a vinyl monomer:

m is an integer of 10 to 300.

Examples of the vinyl monomer used for copolymerization with polydimethylsiloxane include methyl acrylate, ethyl acrylate, n-butyl acrylate, isobutyl acrylate, octyl acrylate, cyclohexyl acrylate, tetrahydrofurfuryl acrylate, methyl methacrylate, ethyl methacrylate, n-butyl methacrylate, isobutyl methacrylate, 2-ethylhexyl methacrylate, stearyl methacrylate, lauryl methacrylate, methyl vinyl ether, ethyl vinyl ether, n-propyl vinyl ether, styrene, α-methylstyrene, acrylonitrile, methacrylonitrile, vinyl acetate, vinyl chloride, vinylidene chloride, vinyl fluoride, vinylidene fluoride, glycidyl acrylate, glycidyl methacrylate, allyl glycidyl ether, acrylic acid, methacrylic acid, itaconic acid, crotonic acid, maleic acid, maleic anhydride, acrylamide, methacrylamide, N-methylol acrylamide, N,N-dimethyl acrylamide, N,N-dimethylaminoethyl methacrylate, N,N-diethylaminoethyl methacrylate, diacetone acrylamide, 2-hydroxyethyl acrylate, 2-hydroxyethyl methacrylate, 2-hydroxypropyl acrylate, 2-hydroxypropyl methacrylate, and allyl alcohol.

Further, the polydimethylsiloxane-based copolymer is preferably produced by a solution polymerization method in a single solvent or a mixed solvent of an aromatic hydrocarbon solvent such as toluene and xylene, a ketone solvent such as methyl ethyl ketone and methyl isobutyl ketone, an ester solvent such as ethyl acetate and butyl acetate, an alcohol solvent such as ethanol and isopropyl alcohol, and the like.

If necessary, a polymerization initiator such as benzoyl peroxide and azobisisobutyro-nitrile is used in combination. The polymerization reaction is preferably carried out at 50 to 150° C. for 3 to 12 hours.

The amount of the polydimethylsiloxane segment in the polydimethylsiloxane-based copolymer is preferably 1 to 30% by mass in 100% by mass of the entire components of the polydimethylsiloxane-based copolymer from the viewpoint of a lubricating property or a contamination resistance of the layer (A). Further, the weight average molecular weight of the polydimethylsiloxane segment is preferably 1,000 to 30,000.

When the polycaprolactone segment is copolymerized or when the segment is added separately, it is preferred in self-healing property, contamination resistance, weather resistance, and heat resistance that the dimethylsiloxane segment accounts for 1 to 20% by mass in 100% by mass of the entire components of the composition to be used for forming the layer (A). As used herein, 100% by mass of the entire components in the composition do not include a solvent which is not involved with the reaction. The monomer component involved with the reaction is included therein.

When the resin containing a polydimethylsiloxane segment is used as a composition for forming the layer (A), the resin may contain (or, be copolymerized with) an additional segment other than the polydimethylsiloxane segment. For example, a (poly)caprolactone segment or a (poly)siloxane segment may be contained (or, be copolymerized).

For the composition to be used for forming the layer (A), a copolymer of a (poly)caprolactone segment and a polydimethylsiloxane segment, a copolymer of a (poly)caprolactone segment and a (poly)siloxane segment, a copolymer of a (poly)caprolactone segment, a polydimethylsiloxane segment, and a (poly)siloxane segment, or the like can be used. The layer (A) obtained by using such a composition can have a (poly)caprolactone segment and a polydimethylsiloxane segment and/or a (poly)siloxane segment.

With respect to the reaction of the polydimethylsiloxane-based copolymer, polycaprolactone, and polysiloxane contained in the composition to be used to form the layer (A) containing a (poly)caprolactone segment, a (poly)siloxane segment and a polydimethylsiloxane segment, copolymerization can be carried out by appropriately adding a (poly)caprolactone segment and a polysiloxane segment during the synthesis of the polydimethylsiloxane-based copolymer.

Other Additives

Preferably, the composition to be used to form the layer (A) contains an initiator, a curing agent, or a catalyst. The initiator and the catalyst are used to promote curing the layer (A). Preferred initiators are ones capable of initiating or promoting the polymerization, conden-sation, or crosslinking reaction of a coating composition by anionic, cationic, or radical reaction.

Various useful initiators, curing agents, and catalysts are available. The initiators, curing agents, and catalysts may be used singly, or two or more of initiators, curing agents, or catalysts may be used together. In addition, acidic catalysts, thermal polymerization initiators, and photopolymerization initiators may also be used in combination. Examples of the acidic catalysts include aqueous hydrochloric acid solution, formic acid, and acetic acid. Examples of the thermal polymerization initiators include peroxides and azo compounds. Examples of the photopolymerization initiators include alkylphenone-based compounds, sulfur-containing compounds, acylphosphine oxide-based compounds, and amine-based compounds. As the photopolymerization initiator, an alkylphenone compound is preferred in curing performance. Specific examples of the alkylphenone compound include 1-hydroxy-cyclohexyl-phenyl-ketone, 2,2-dimethoxy-1,2-diphenylethane-1-one, 2-methyl-1-(4-methylthiophenyl)-2-morpholinopropan-1-one, 2-benzyl-2-dimethylamino-1-(4-phenyl)-1-butane, 2-(dimethylamino)-2-[(4-methylphen-yl)methyl]-1-(4-phenyl)-1-butane, 2-benzyl-2-dimethylamino-1-(4-morpholinophenyl)-1-butane, 2-(dimethylamino)-2-[(4-methylphenyl)methyl]-1-[4-(4-morpholinyl)phenyl]-1-butane, 1-cyclo-hexyl-phenyl ketone, 2-methyl-1-phenylpropan-1-one, and 1-[4-(2-ethoxy)-phenyl]-2-hydroxy-2-methyl-1-propan-1-one.

Moreover, a leveling agent, a UV absorber, a lubricant, an antistatic agent, or the like may be added to the composition to be used to form the layer (A) as long as the effect is not impaired. Accordingly, the layer (A) can contain a leveling agent, a UV absorber, a lubricant, an antistatic agent, or the like. Examples of the leveling agent include an acrylic copolymer, a silicone leveling agent, and a fluorine leveling agent. Specific examples of the UV absorber include benzophenone-based, benzotriazole-based, oxalic anilide-based, triazine-based, and hindered amine-based UV absorbers. Examples of the antistatic agent include metal salts such as a lithium salt, a sodium salt, a potassium salt, a rubidium salt, a cesium salt, a magnesium salt, and a calcium salt.

It is preferred in the laminated film that the layer (A) is a layer (A) obtainable by curing a composition including a urethane(meth)acrylate (B) and a urethane(meth)acrylate (C) with an active energy ray, the urethane(meth)acrylate (B) has at least a (poly)caprolactone segment, and the urethane(meth)acrylate (C) has at least a (poly)alkylene glycol segment. The laminated film is excellent in self-healing property and contamination resistance because of such a configuration.

Generally, in a self-healing material, since the soft segment component contained serves like as cushion and thereby elastically repairs slight scratches, increasing the soft segment component enables improvement in self-healing property. Specifically, an excellent self-healing property can be attained by increasing (1) the (poly)caprolactone segment and (3) the (poly)alkylene glycol segment in the layer (A). However, if a method of improving the self-healing property of the layer (A) by such an improvement method is adopted, the proportion of the free volume of the molecules constituting the layer (A) increases so that oils and chemicals are promoted to permeate between molecules and the contamination resistance of the layer (A) is impaired. On the other hand, reducing (1) the (poly)caprolactone segment and (3) the (poly)alkylene glycol segment in the layer (A) improves the contamination resistance of the layer (A) but impairs the self-healing property. Therefore, since the self-healing property and the contamination resistance are properties that are contrary to each other, it is very difficult to satisfy both of them. To satisfy the self-healing property and contamination resistance, it is important to cure a composition that is to be used for forming a layer (A) and contains a urethane(meth)acrylate (B), which is excellent in self-healing property, and a urethane(meth)acrylate (C), which is excellent in contamination resistance, with an active energy ray such as an ultraviolet ray and an electron beam.

Performance of Layer (A)

It is important for the laminated film that the maximum displacement amount in the thickness direction of the layer (A) is 1.0 to 3.0 µm and the creep displacement amount in the thickness direction of the layer (A) is 0.2 to 0.5 µm when a load of 0.5 mN is applied for 10 seconds, and the permanent displacement amount in the thickness direction of the layer (A) is 0.3 to 0.65 µm when the load is released to 0 mN.

The maximum displacement amount in the thickness direction of the layer (A) is more preferably from 1.2 to 3.0 µm. The creep displacement amount in the thickness direction of the layer (A) is more preferably from 0.3 to 0.4 µm. The permanent displacement amount in the thickness direction of the layer (A) is more preferably from 0.4 to 0.6 µm. An excellent self-healing property is exhibited when the maximum displacement amount in the thickness direction of the layer (A) is from 1.0 to 3.0 µm, the creep displacement amount in the thickness direction of the layer (A) is from 0.2 to 0.5 µm, and the permanent displacement amount in the thickness direction of the layer (A) is from 0.3 to 0.65 µm.

Preferably, the elongation at break of the layer (A) of the laminated film is 50% or more. When the elongation at break of the layer (A) is 50% or more, the laminated film can be used for molding decoration applications because of its excellent molding conformability. It is preferred that particles having an average particle diameter of 0.3 µm or less are contained in an amount of 0.05 to 2% by mass in the layer (A) to adjust the elongation at break of the layer (A) to 50% or more. It is undesirable that the average particle diameter of the particles contained in the layer (A) is more than 0.3 µm because this impairs the transparence of the layer (A). Moreover, it is undesirable that the content of the particles in the layer (A) is less than 0.05% by mass because this is likely to cause secondary aggregation, whereas it is also undesirable that the content of the particles in the layer (A) is more than 2% by mass because this roughens the surface of the layer (A) to lose transparency.

Examples of the particles to be used in the layer (A) include silica fine particles such as dry silica and wet silica, fine particles of metal oxides such as titanium oxide, zirconium oxide, zinc oxide, tin oxide, cerium oxide, antimony oxide, indium tin mixed oxide and antimony tin mixed oxide, and organic fine particles such as acrylic fine particles and styrenic fine particles. Various types of commercially available products containing an organic solvent as a dispersing medium can also be used. The shape of the fine particles is preferably, but is not particularly limited to, a spherical shape or a beads string-like shape. Above all, it is preferred to use silica fine particles because the resulting laminated film is low in transparency and the fine particles attains good dispersibility when blended into a coating agent.

It is preferred for the laminated film that the dissolved cosmetic concentration of the layer (A) is 2.9% by mass or less when a cosmetic is applied to the surface of the layer (A) and then kept in a 60° C. atmosphere for 6 hours.

Especially, the dissolved cosmetic concentration of the layer (A) under the above-described conditions is more preferably 0.3% by mass or more and 1.5% by mass or less. When the dissolved cosmetic concentration of the layer (A) is 2.9% by mass or less, good contamination resistance is attained, and when the dissolved cosmetic concentration is 1.5% by mass or less, almost no problems derived from contamination occur. The lower the dissolved cosmetic concentration of the layer (A) is, the better the contamination resistance is. However, when the layer (A) contains a (poly)caprolactone segment, the lower limit is considered to be about 0.3% by mass because it is difficult to adjust the dissolved cosmetic concentration to less than 0.3% by mass. The contamination resistance indicates the degree of resistance to discoloration of the surface or generation of maculae on the surface on coming into contact with creams, permanent marker ink, and polyvinyl chloride sheet.

It is preferred for the laminated film that the mass increase ratio of the layer (A) is 10% by mass or less when oleic acid is applied to the surface of the layer (A) and then kept in a 60° C. atmosphere for 1 hour.

Especially, the mass increase ratio of the layer (A) under the above-described conditions is more preferably 0.3% by mass or more and 5.0% by mass or less, even more preferably 0.3% by mass or more and 3.0% by mass or less. Contamination resistance is better if the mass increase ratio of the layer (A) due to oleic acid is 10% by mass, and almost no problems caused by contamination occur if the mass increase ratio is 3.0% by mass or less. The lower the mass increase ratio of the layer (A) due to oleic acid is, the better the contamination resistance is. However, when the layer (A) contains a (poly)alkylene glycol segment, the lower limit is considered to be about 0.3% by mass because it is difficult to adjust the mass increase ratio due to oleic acid to less than 0.3% by mass. The contamination resistance indicates the degree of resistance to discoloration of the surface or generation of maculae on the surface on coming into contact with creams, permanent marker ink, and polyvinyl chloride sheet.

It is preferable for the laminated film that the dissolved cosmetic concentration of the layer (A) is 2.9% by mass or less when a cosmetic is applied to the surface of the layer (A) and then kept in a 60° C. atmosphere for 6 hours or the mass increase ratio of the layer (A) is 10% by mass or less when oleic acid is applied to the surface of the layer (A) and then kept at 60° C. for 1 hour, and that in measurement using a micro hardness tester, the maximum displacement amount in the thickness direction of the layer (A) is 1.0 to 3.0 μm and the creep displacement amount in the thickness direction of the layer (A) is 0.05 to 0.5 μm when a load of 0.5 mN is applied for 10 seconds and the permanent displacement amount in the thickness direction of the layer (A) is 0.2 to 0.65 μm when the load is released to 0 mN. The laminated film satisfies both of the cosmetics resistance and the self-healing property.

It is important in the method to form the layer (A) by curing a composition comprising a urethane(meth)acrylate (B) described below, which is excellent in self-healing property, and a urethane(meth)acrylate (C) described below, which is excellent in contamination resistance, with an active energy ray such as an ultraviolet ray and an electron beam.

Urethane(Meth)Acrylate (B)

A urethane(meth)acrylate (B) excellent in self-healing property refers to such a urethane(meth)acrylate that physical properties falling within the following ranges are attained with a layer (hereinafter referred to as layer (B)) formed by curing a mixture of the urethane(meth)acrylate and a photoinitiator to have a thickness of 30 μm with ultraviolet rays emitted from a high-pressure mercury lamp with an illuminance of 400 mW/cm$^2$.

The dissolved cosmetic concentration of the layer (B) is 4.0% by mass or less when a cosmetic is applied to the surface of the layer (B) and then kept in a 60° C. atmosphere for 6 hours or the mass increase ratio of the layer (B) is 45% by mass or less when oleic acid is applied to the surface of the layer (B) and then kept at 60° C. for 1 hour, and in measurement using a micro hardness tester, the maximum displacement amount in the thickness direction of the layer (B) is from 1.0 to 3.0 μm and the creep displacement amount in the thickness direction of the layer (B) is 0.4 to 0.7 μm when a load of 0.5 mN is applied for 10 seconds.

Urethane(Meth)Acrylate (C)

A urethane(meth)acrylate (C) excellent in cosmetics resistance refers to such a urethane(meth)acrylate that physical properties falling within the following ranges are attained with a layer (hereinafter referred to as layer (C)) formed by curing a mixture of the urethane(meth)acrylate and a photoinitiator to have a thickness of 30 μm with ultraviolet rays emitted from a high-pressure mercury lamp with an illuminance of 400 mW/cm$^2$.

The dissolved cosmetic concentration of the layer (A) is 2.5% by mass or less when a cosmetic is applied to the surface of the layer (C) and then kept in a 60° C. atmosphere for 6 hours or the mass increase ratio of the layer (C) is 5.0% by mass or less when oleic acid is applied to the surface of the layer (C) and then kept at 60° C. for 1 hour, and in measurement using a micro hardness tester, the maximum displacement amount in the thickness direction of the layer (C) is 1.0 to 3.0 μm and the creep displacement amount in the thickness direction of the layer (C) is 0.05 to 0.35 μm when a load of 0.5 mN is applied for 10 seconds.

Moreover, by adjusting the content ratio of the urethane(meth)acrylate (B) and the urethane(meth)acrylate (C) in the composition to be used to form the layer (A) (the mass of the urethane(meth)acrylate (B)/the mass of the urethane(meth)acrylate (C)) to 70/30 to 30/70 and curing the composition to be used to form the layer (A), it is possible to obtain a laminated film wherein the dissolved cosmetic concentration of the resulting layer (A) is 2.9% by mass or less or the mass increase ratio of the layer (A) due to oleic acid is 10% by mass or less, and, in measurement using a micro hardness tester, the maximum displacement amount in the thickness direction of the layer (A) is 1.0 to 3.0 μm and the creep displacement amount in the thickness direction of the layer (A) is 0.2 to 0.5 μm when a load of 0.5 mN is applied for 10 seconds, and the permanent displacement amount in the thickness direction of the layer (A) is 0.3 to 0.65 μm, and it is possible to satisfy both the cosmetics resistance and the self-healing property. If the content ratio of the urethane(meth)acrylate (B) and the urethane(meth)acrylate (C) in the composition to be used to form the layer (A) (the mass of the urethane(meth)acrylate (B)/the mass of the urethane(meth)acrylate (C)) is out of 70/30 to 30/70, it is difficult to satisfy both the cosmetics resistance and the self-healing property.

The compositions of the urethane(meth)acrylate (B) and the urethane(meth)acrylate (C) are not particularly limited as long as a (poly)caprolactone segment is contained in any one of the urethane(meth)acrylates.

To allow the dissolved cosmetic concentration of the layer (A) to be 1.5% by mass or less when a cosmetic is applied to the surface of the layer (A) and then kept in a 60° C. atmosphere for 6 hours or the mass increase ratio of the layer (A) to be 3.0% by mass or less when oleic acid is applied to the surface of the layer (A) and then kept at 60° C. for 1 hour, and in measurement using a micro hardness tester, allow the maximum displacement amount in the thickness direction of the layer (A) to be 1.2 to 3.0 μm, the creep displacement amount in the thickness direction of the layer (A) to be 0.3 to 0.4 μm, and the permanent displacement amount in the thickness direction of the layer (A) to be 0.4 to 0.6 μm when a load of 0.5 mN is applied for 10 seconds, it is required that the urethane(meth)acrylate (B) and the urethane(meth)acrylate (C) in the composition to be used for forming the layer (A) contain at least a (poly)caprolactone segment and at least a (poly)alkylene glycol segment, respectively. It can be attained by adjusting the properties of the layer (B) and the layer (C) to within the following ranges.

Physical Properties of Layer (B)

The dissolved cosmetic concentration of the layer (B) is 2.9% by mass or less when a cosmetic is applied to the surface of the layer (B) and then kept in a 60° C. atmosphere for 6 hours or the mass increase ratio of the layer (B) is 5.0% by mass or less when oleic acid is applied to the surface of the layer (B) and then kept at 60° C. for 1 hour, and the maximum displacement amount in the thickness direction of the layer (B) is 1.2 to 3.0 μm and the creep displacement amount in the thickness direction of the layer (B) is 0.4 to 0.5 μm.

Properties of Layer (C)

The dissolved cosmetic concentration of the layer (C) is 1.4% by mass or less when a cosmetic is applied to the surface of the layer (C) and then kept in a 60° C. atmosphere for 6 hours or the mass increase ratio of the layer (C) is 3.0% by mass or less when oleic acid is applied to the surface of the layer (C) and then kept at 60° C. for 1 hour, and the maximum displacement amount in the thickness direction of the layer (C) is 1.2 to 3.0 μm and the creep displacement amount in the thickness direction of the layer (C) is 0.1 to 0.25 μm.

Moreover, the above-described laminated film can be obtained by curing a composition to be used to form the layer (A) prepared by mixing the urethane(meth)acrylate (B) and the urethane(meth)acrylate (C) into their content ratio of 70/30 to 30/70, and the film is excellent in cosmetics resistance and self-healing property. It is impossible to satisfy both the self-healing and the cosmetics resistance if the content ratio is out of that range.

A layer (A) excellent in self-healing property and cosmetics resistance can be obtained when the composition to be used to form the layer (A) contains the urethane(meth) acrylate (B) and the urethane(meth)acrylate (C) and the urethane(meth)acrylate (B) has a (poly)caprolactone segment and the urethane(meth)acrylate (C) has a (poly)alkylene glycol segment. We believe that the effect is made more remarkable because of the fact that the (poly)alkylene glycol segment excellent in cosmetics resistance unevenly distributes on the surface in curing due to the difference between a surface tension and an intermolecular force and the (poly) caprolactone segment excellent in self-healing property unevenly distributes within the inner layer.

Especially, the mass m of the (poly)alkylene glycol segment in the resin contained in the layer (A) and the mass n of the (poly)caprolactone segment in the resin contained in the layer (A) preferably satisfy $0.3n \leq m \leq 10n$, more preferably satisfy $0.3n \leq m \leq 5n$, and even more preferably satisfy $0.65n \leq m \leq 1.20n$. If the mass m of the (poly)alkylene glycol segment in the resin contained in the layer (A) and the mass n of the (poly)caprolactone segment in the resin contained in the layer (A) satisfy $0.3n \leq m \leq 10n$, the uneven distribution of the respective segments in the above-described curing occurs more remarkably so that a layer (A) more improved in self-healing property and cosmetics resistance can be obtained. When the mass m of the (poly)alkylene glycol segment in the resin contained in the layer (A) and the mass n of the (poly)caprolactone segment in the resin contained in the layer (A) fails to satisfy $0.3n \leq m \leq 10n$, the dispersibility of the respective segments attained in the above-described curing increases and the uneven distribution may be relieved.

Thickness of Layer (A)

According to the laminated film, the thickness of the layer (A) is preferably adjusted to 10 to 30 μm to obtain a laminated film having good self-healing property and good cosmetics resistance. Adjustment of the layer of the layer (A) to 10 to 30 μm makes it possible to afford a laminated film having a self-healing effect and being good in contamination resistance. More preferably, adjustment of the thickness of the layer (A) to 10 to 20 μm reduces the dissolved cosmetic concentration of the layer (A) or the mass increase ratio of the layer (A) so that the contamination resistance is improved.

Dynamic Coefficient of Friction of Layer (A)

It is preferable for the laminated film that the dynamic coefficient of friction (μk) of the layer (A) is 0.45 or less. When the dynamic coefficient of friction (μk) is 0.45 or less, the laminated film excels in touch feeling when touching. When the dynamic coefficient of friction (μk) is 0.12 or more and 0.30 or less, a laminated film having more improved scratch resistance as well as excelling in touch feeling can be obtained. The resin containing a (poly)siloxane segment or the resin containing a polydimethylsiloxane segment preferably accounts for 1 to 5% by mass in 100% by mass of all the components constituting the layer (A) to reduce the dynamic coefficient of friction of the layer (A) to 0.45 or less.

Moreover, it is preferable for the laminated film that the difference (μk–μk) between the static coefficient of friction (μs) and the dynamic coefficient of friction (μk) of the layer (A) is 0.05 or less. "00.05 or less" also encompasses a case of being minus, that is, an example that the dynamic coefficient of friction is greater than the static coefficient of friction. That the (μs–μk) is 0.05 or less is preferred because this makes it possible to write characters smoothly, for example, when the laminated film is applied to a sheet member surface to which pens or fingers are to touch directly. The (μs–μk) is preferably 0.04 or less, more preferably 0.03 or less. The lower limit of the (μs–μk) is –0.15, and this is preferred because characters can be written smoothly in this case. Examples of the method of adjusting the (μs–μk) to 0.05 or less include the following methods:

a) A self-healing resin layer is allowed to contain a resin having a urethane bond resulting from a reaction between a caprolactone and an isocyanate.

b) A self-healing resin layer is allowed to contain an organosilicon compound and/or a fluorine compound.

c) The self-healing property (the time taken by scratches to disappear) of a self-healing resin layer is adjusted.

d) Particles are added.

While these measures can be used either individually or in combination, possession of the above-described (poly)siloxane segment and/or the polydimethylsiloxane segment is the most preferred measure.

Method for Forming Layer (A)

The layer (A) of the laminated film can be produced, for example, by performing, in order, a laminating process, a heating process, and an energy ray irradiation process.

Laminating Process

On at least one side of a base film is laminated a layer containing (1) a (poly)caprolactone segment and (2) a urethane bond. Lamination of the layer (A) on a base film can be carried out, for example, by a method of applying a coating solution containing the materials to form the layer (A) and, as necessary, a solvent to at least one side of the base film. Further, examples of the applying method that can be used include an applying method known in the field such as a Gravure coating method, a Microgravure coating method, a die coating method, a reverse coating method, a knife coating method, and a bar coating method.

Heating Process

The solvent in a layer can be volatilized by heating. As for the method of heating for the heating process, it is preferably performed with hot air from the viewpoint of heating efficiency. A known hot air dryer or a hot air furnace which allows continuous return like roll return or floating may be used. The heating temperature in the heating process is preferably 60° C. or more and, more preferably, the solvent can be evaporated sufficiently by heating at 80° C. or more. In view of generation of wrinkles caused by thermal shrinkage of a base film, the heating temperature is preferably 180° C. or less and, to improve adhesion to the base film, heating is preferably carried out at a temperature of 120° C. or more.

The heating time is 1 minute or more, preferably 2 minutes or more, and more preferably 3 minutes or more. From the viewpoint of maintaining the productivity and the dimensional stability and the transparency of a base film, the heating time is preferably 5 minutes or less.

Energy Ray Irradiation Process

The composition to be used to form the layer (A) can be cured by irradiating it with an energy ray. In terms of versatility, the curing with an energy ray is preferably carried out with electron beams (EB rays) or ultraviolet rays (UV rays). Examples of the types of ultraviolet ray lamps to be used for applying ultraviolet rays include an electric discharge lamp, a flash lamp, laser, and an electrodeless lamp. When ultraviolet curing is performed using an electric discharge type high pressure mercury lamp, the illuminance of ultraviolet rays is 100 mW/cm$^2$ or more and 3,000 mW/cm$^2$ or less. It is preferred to perform the curing at an UV illuminance of 200 mW/cm² or more and 1,000 mW/cm² or less to satisfy both the self-healing property and the contamination resistance. The illuminance of ultraviolet rays refers to the irradiation intensity received per unit area and depends on the output of the lamp, the emission spectrum efficiency, the diameter of the lamp bulb, the design of the reflecting mirror, and the distance between the irradiated object and the light source. The illuminance, however, does not depend on the optical carrier speed. The accumulated quantity of ultraviolet rays refers to the irradiation energy received per unit area and it is equal to the total quantity of photons reaching the surface. The accumulated light quantity is inversely proportional to the irradiation rate under the light source and proportional to the number of irradiation runs and the number of lamps used.

Preferred applications of the laminated film include decoration molding applications to be applied to housings of personal computers, cellular phones, and the like, and screen protect-tion applications for touch panels, anti-reflection plates, and the like. The laminated film can be fabricated into a molded body by using a molding method such as injection molding, pressure molding, vacuum molding, heat molding, and press molding. Of these, it may be particularly preferably applied for applications including heating at 80° C. to 180° C. during molding.

Method of Measuring Characteristics and Method of Evaluating Effect

The method of measuring characteristics and method of evaluating their effect are described below.

(1) Thickness of Layer (A)

A cross section of a laminated film is obtained by freezing the film and then cutting it with a diamond knife of a microtome (manufactured by Nihon Microtome Laboratory, Inc., RMS-50). The cross section obtained was magnified with an optical microscope to a magnification within a range from ×100 to ×300, and the thickness of a layer (A) was measured from an image photograph in which a clear interface between a base film and the layer (A) was observed. The average value of measurements of three samples was used.

(2) Dissolved Cosmetic Concentration of Layer (A)

A laminated film is cut into a size of 200 mm×200 mm, and the mass of the resulting film is taken as A (g). The film is fixed to a Bakelite plate and a 1:1 (mass basis) mixed liquid of ATRIX "hand cream A" (NO413) produced by Kao Corporation and distilled water is applied to the layer (A), and then on the applied surface is placed a 3 mm thick glass plate sized 95 mm×95 mm (at this time, no air is allowed to remain between the laminated film and the glass plate, and the cosmetic out of the glass plate is wiped up). This sample was kept for 6 hours in a high temperature and high humidity oven containing an atmosphere of 60° C. and 95RH %. After the keeping, the cosmetic of the layer A was wiped up with a "Haize"-Gauze until the layer was clear, and then the sample was kept in a 23° C. atmosphere for 24 hours. The mass of the film measured thereafter was taken as B (g). The dissolved cosmetic concentration (% by mass) at this time was calculated from the formula:

$$(B-A)/(400 \times t \times d) \times 100$$

t: thickness of layer (A) (cm)
d: specific gravity (g/cm³) of layer (A).

(3) Oleic Acid Mass Increase Ratio of Layer A

A laminated film was cut into a size of 200 mm×200 mm, and the mass of the resulting laminated film was taken as A (g). This was fixed to a Bakelite plate and oleic acid was applied over 100 mm×100 mm in length on the layer (A) side. In the application, a frame was made of plastic to thereby prevent the oleic acid from flowing out. The sample was kept for one hour in an oven heated at 60° C. After the heating, the laminated film was wiped up with a "Haize"-Gauze until the film was clear, and then kept in a 23° C. atmosphere for 24 hours. The mass of the film measured thereafter was taken as B (g). The mass increase ratio due to oleic acid at this time was calculated from the following formula. Measurement was performed three times, and the average value was taken.

$$(B-A)/(100 \times t \times d) \times 100$$

t: thickness of layer (A) (cm)
d: specific gravity (g/cm³) of layer (A).

(4) Specific Gravity of Layer A

A section of a layer (A) was cut out with a single-edge knife from a laminated film, and measurement was performed in accordance with a density gradient tube method (JIS K7112, JIS Handbook (1999 version)) using an aqueous sodium bromide solution as a medium. At this time, measurement was repeated five times, and the average of the measured values was adopted.

(5) Maximum Displacement Amount, Creep Displacement Amount, and Permanent Displacement Amount in the Thickness Direction of Layer (A)

One gram of "High Vacuum Grease" produced by Dow Corning Toray Co., Ltd. was applied to a smooth metal plate (die steel: SKD-11) and a laminated film was stuck on its base film side to the applied portion, followed by pressing by a portable presser with filter paper placed on a surface while not allowing air to be included. An equilateral triangular pyramid was pushed against the sample prepared by such a method and left at rest, thereby carrying out a loading/unloading test so that a load-pushing depth diagram (see FIG. 1) was obtained.

Figure 1:
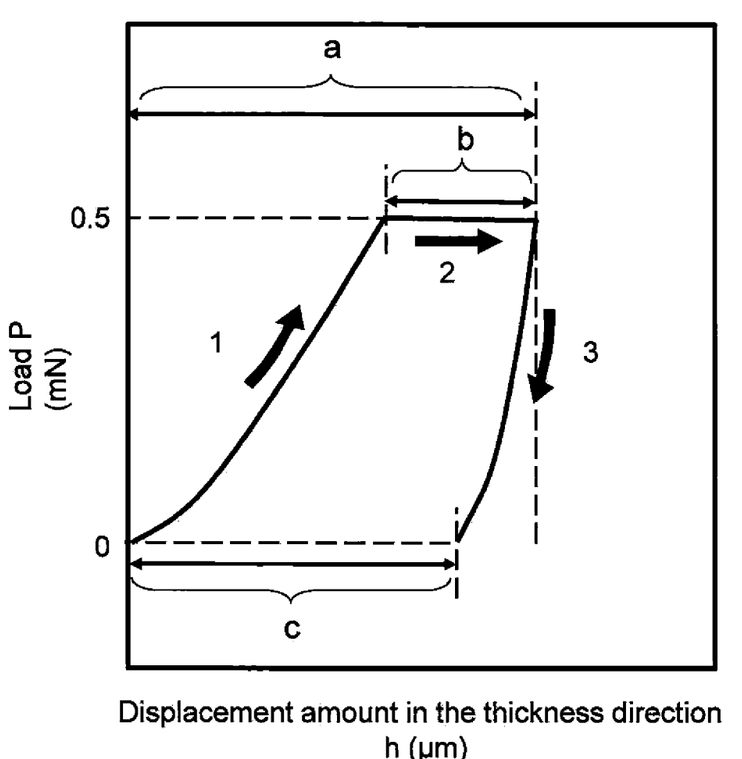
FIG. 1 is a load-pushing depth diagram produced when a loading/unloading test is carried out by pushing an equilateral triangular pyramid against a laminated film.

From this diagram, a displacement amount in the thickness direction attained from the application of load to the removal of the load (maximum displacement amount), a displacement amount in the thickness direction attained when a load of 0.5 mN was kept for 10 seconds after the arrival at this load (creep displacement amount), and a displacement amount in the thickness direction when the load was released to 0 mN after the load keeping for 10 seconds (permanent displacement amount) were determined. Measurement was performed three times, and the average value was taken.

Instrument: Dynamic Ultra Micro Hardness Tester "DUH-201" (manufactured by Shimadzu Corporation)
Indenter used: diamond equilateral triangular pyramid indenter (apex angle: 115°)
Measurement mode: 2
Maximum load: 0.5 mN
Retention time when the load reached 10 mN: 10 seconds
Loading rate, unloading rate: 0.1422 mN/s (6) Cosmetics Resistance To a sample cut into a square 5 cm on each side is applied 0.5 g of ATRIX "Hand Cream A" (NO413) produced by Kao Corporation, and the sample is then left at rest for 6 hours under an atmosphere of a temperature of 60° C. and a relative humidity of 95% and further for 30 minutes under an atmosphere of a temperature of 25° C. and a relative humidity of 65%, and subsequently the surface is clearly wiped up with a gauze. After leaving at rest for 24 hours under an atmosphere of a temperature of 25° C. and a relative humidity of 65%, the condition of the surface was observed and judged in accordance with following criteria:

○ (Very good): No white spots are formed.
● (Good): Almost no white spots are formed.
Δ (Passed): White spots are formed, but they can be removed by wiping.
x (Not passed): White spots are formed. Even if they are wiped off, white spots are formed again after leaving at rest for 24 hours under an atmosphere of a temperature of 25° C. and a relative humidity of 65%.

(7) Self-Healing Property of Layer (A)

The surface of a layer (A) is scratched horizontally with a brass brush (manufactured by TRUSCO) under a load of 500 g, and then the healing state of scratches was judged visually in accordance with the following criteria:
⊙ (Very good): All scratches are healed within 3 seconds.
○ (Good): All scratches are healed within 4 to 10 seconds.
● (Passed): All scratches are healed within 11 to 30 seconds.
x (Not passed): Others (It takes 31 seconds or more before all scratches are healed, or some scratches remain unhealed.)

(8) Dynamic Coefficient of Friction and Static Coefficient of Friction of Layer (A)

A dynamic coefficient of friction (μk) attained when a sheet member surface was moved at a load of 200 g and a rate of 100 mm/sec by using a touch pen (produced by STYLUS) made of a polyacetal resin with a having a hemispherical tip having a radius of 0.8 mm under an atmosphere of 23° C. and 50% (relative humidity) was measured with a surface tester (trade name "TriboGear," type "14FW") manufactured by SHINTO Scientific Co., Ltd. Measurement was performed three times, and the average value was taken.

Measurement Conditions
  Measurement length: 100 mm
  Output device: automatic detection to a computer
  Load transducer capacity: 2000 g
  Sampling speed: 2 ms
  Static coefficient of friction: calculated from a load at the first peak point.
  Dynamic coefficient of friction: calculated from the average load at the last 20 mm in a measurement length of 100 mm (9) Elongation at Break of Layer (A)

A laminated film was cut to have a size of 10 mm in width and 200 mm in length, clamped in the length direction with a chuck, and stretched at a stretch speed of 100 mm/minute by using an Instron type tensile tester (ultra-precision material tester, MODEL 5848, manufactured by Instron). The measuring atmosphere at this time was of 23° C. and 65RH %. In stretching, a sample under stretching is observed, and if a crack is found visually, the stretching is stopped (the degree of elongation at the stopping is adjusted to be an integer of 5). Next, samples to be measured were taken in order by reducing the elongation by 5% from the elongation at the stopping and measurement was carried out until no cracks were eventually come to be found by visual observation. A thin film cross section of a cracked portion of the sample taken was cut out, and the layer (A) was observed at a magnification as high as the thickness of the layer (A) to be observed is 30 mm or more in an image observed with a transmission electron microscope. In the case that cracks having a depth 50% or more of the average thickness of the layer (A) were formed, this was judged as having cracks (having fracture in the layer (A)), and the value of the elongation of a sample that was lowest in elongation among the samples judged as having cracks was determined as an elongation at break. The same measurement was performed three times, and the average of these elongations at break was taken as the elongation at break of the layer (A).

(10) Diameter of Particles in Layer (A)

For a sample prepared by cutting out a cross section of a laminated film by using a microtome, measurement was carried out by electron microscope observation. Specifically, the cross section of the film was observed at a magnification of 20,000× at an acceleration voltage of 75 kV by using a transmission electron microscope H-7100FA (manufactured by Hitachi, Ltd.) to take a cross-sectional photography, and then the layer configuration and the thickness of each layer were measured. Optionally, known dyeing technologies using $RuO_4$, $OsO_4$ or the like may be used to obtain a higher contrast.

Formation of Layer (B) and Layer (C)

Each of radically polymerizable compositions having a solid content of 50% by mass was prepared by mixing 3 parts by mass of a photoinitiator (Irgacure 184, produced by Ciba Specialty Chemicals) with 100 parts by mass of each of compositions of raw materials 1 to 10 and raw materials 12 to 14 described below. Each of the compositions was applied to a 100 μm thick polyester base film (produced by Toray Industries, Inc., "Lumirror" U46) with a bar coater so that the film thickness of the layer after drying was 30 μm. This was allowed to pass through a drying furnace at 80° C. and dried for one minute and, subsequently, was cured while being moved at a conveyor speed of 4 m/min in a UV drying furnace with a high-pressure mercury lamp having an output of 400 mW/cm², thereby affording a laminated film. The obtained results are shown in Tables 1 and 2.

"Raw Materials"

Raw Material 1

Fifty parts by mass of toluene, 50 parts by mass of isocyanurate-modified type hexamethylene diisocyanate (Takenate D-170N, produced by Takeda Chemical Industries, Ltd.), 76 parts by mass of (poly)caprolactone-modified hydroxyethyl acrylate (PLACCEL FA5, produced by Daicel Chemical Industries, Ltd.), 0.02 parts by mass of dibutyltin laurate, and 0.02 parts by mass of hydroquinone monomethyl ether were mixed and kept at 70° C. for 5 hours. Subsequently, 79 parts by mass of toluene was added, affording a mixture of urethane acrylate having a solid content of 50% by mass.

Raw Material 2

Fifty parts by mass of toluene, 50 parts by mass of biuret-modified type hexamethylene diisocyanate (Duranate 24A-90CX, produced by Asahi Kasei Corporation, nonvolatile content: 90% by mass, isocyanate content: 21.2% by mass), 92 parts by mass of (poly)caprolactone-modified hydroxyethyl acrylate (PLACCEL FA2D, produced by Daicel Chemical Industries, Ltd.), 0.02 parts by mass of dibutyltin laurate, and 0.02 parts by mass of hydroquinone monomethyl ether were mixed and kept at 70° C. for 5 hours. Subsequently, 82 parts by mass of toluene was added, affording a urethane acrylate having a solid content of 50% by mass. The number of repetitions of a caprolactone unit per acrylate monomer residue in this urethane acrylate is 2.

Raw Material 3

Fifty parts by mass of toluene, 24 parts by mass of isocyanurate-modified type hexamethylene diisocyanate (Takenate D-170N, produced by Takeda Chemical Industries, Ltd.), 162.8 parts by mass of (poly)caprolactone-modified hydroxyethyl acrylate (PLACCEL FA10, produced by Daicel Chemical Industries, Ltd.), 0.02 parts by mass of dibutyltin laurate, and 0.02 parts by mass of hydroquinone monomethyl ether were mixed and kept at 70° C. for 5 hours. Subsequently, 137.8 parts by mass of toluene was added, affording a urethane acrylate having a solid content of 50% by mass. The number of repetitions of a caprolactone unit per acrylate monomer residue in this urethane acrylate is 10.

Raw Material 4

Fifty parts by mass of toluene, 50 parts by mass of isocyanurate-modified type hexamethylene diisocyanate (Takenate D-170N, produced by Takeda Chemical Industries, Ltd.), 114 parts by mass of (poly)caprolactone-modified hydroxyethyl acrylate (PLACCEL FA3, produced by Daicel Chemical Industries, Ltd.), 0.02 parts by mass of dibutyltin laurate, and 0.02 parts by mass of hydroquinone monomethyl ether were added and kept at 70° C. for 3 hours. Subsequently, 118.2 parts by mass of toluene was added, affording a urethane acrylate having a solid content of 50% by mass. The number of repetitions of a caprolactone unit per acrylate monomer residue in this urethane acrylate is 3.

Raw Material 5

One hundred parts by mass of toluene, 50 parts by mass of methyl-2,6-diisocyanate hexanoate (LDI, produced by Kyowa Hakko Kogyo Co., Ltd.), and 119 parts by mass of polycarbonate diol (PLACCEL CD-210HL, produced by Daicel Chemical Industries, Ltd.) were mixed, heated to 40° C., and kept for 8 hours. Subsequently, 28 parts by mass of 2-hydroxyethyl acrylate (LIGHT ESTER HOA, produced by Kyoeisha Chemical Co., Ltd.), 5 parts of dipentaerythritol hexaacrylate (M-400, produced by Toagosei Co., Ltd.), 0.02 parts by mass of hydroquinone monomethyl ether were added and kept at 70° C. for 30 minutes, and then 0.02 parts by mass of dibutyltin laurate was added and kept at 80° C. for 6 hours. Finally, 97 parts by mass of toluene was added, affording a urethane acrylate having a solid content of 50% by mass.

Raw Material 6

Fifty parts by mass of an isocyanurate-modified form of hexamethylene diisocyanate (Takenate D-170N, produced by Takeda Chemical Industries, isocyanate group content: 20.9% by mass), 42 parts by mass of polyethylene glycol monoacrylate (BLEMMER AE-90, produced by NOF Corporation, hydroxyl value: 332 (mgKOH/g)), 0.02 parts by mass of dibutyltin laurate, and 0.02 parts by mass of hydroquinone monomethyl ether were charged. Subsequently, they were kept at 70° C. for 5 hours and allowed to react. After the completion of the reaction, 92 parts by mass of methyl ethyl ketone (MEK) was added to the reaction liquid, affording a urethane acrylate having a solid content of 50% by mass.

Raw Materials 7 to 9

A urethane acrylate (raw material 7) was obtained in the same manner as in the case of raw material 6 except that the polyethylene glycol monoacrylate was changed to 53 parts by mass of BLEMMER AE-150 (hydroxyl value: 264 (mgKOH/g)) and the amount of MEK in the reaction liquid was changed to 102 parts by mass.

Moreover, a urethane acrylate (raw material 8) was obtained in the same manner as in the case of raw material 6 except that the polyethylene glycol monoacrylate was changed to 68 parts by mass of BLEMMER AE-200 (hydroxyl value: 205 (mgKOH/g)) and the amount of MEK in the reaction liquid was changed to 118 parts by mass.

Moreover, a urethane acrylate (raw material 9) was obtained in the same manner as in the case of raw material 6 except that the polyethylene glycol monoacrylate was changed to 142 parts by mass of BLEMMER AE-400 (hydroxyl value: 98 (mgKOH/g)) and the amount of MEK in the reaction liquid was changed to 192 parts by mass.

Raw Material 10

Fifty parts by mass of toluene, 50 parts by mass of isocyanurate-modified type hexamethylene diisocyanate (Takenate D-170N, produced by Takeda Chemical Industries, Ltd.), 70 parts by mass of (poly)caprolactone-modified hydroxyethyl acrylate (PLACCEL FA5, produced by Daicel Chemical Industries, Ltd.), 8 parts of polydimethylsiloxane (X-22-160AS, produced by Shin-Etsu Chemical Co., Ltd.), 0.02 parts by mass of dibutyltin laurate, and 0.02 parts by mass of hydroquinone monomethyl ether were mixed and kept at 70° C. for 5 hours. Subsequently, 79 parts by mass of toluene was added, affording a mixture of urethane acrylate having a solid content of 50% by mass.

Raw Material 11

Synthesis of Polysiloxane (a)

A 500 mL flask equipped with a stirrer, a thermometer, a condenser, and a nitrogen gas inlet tube was charged with 106 parts by mass of ethanol, 270 parts by mass of methyltrimethoxysilane, 23 parts by mass of γ-methacryloxypropyl methyl dimethoxysilane, 100 parts by mass of deionized water, 1 part by mass of 1 mass % hydrochloric acid, and 0.1 parts by mass of hydroquinone monomethyl ether, and then they were allowed to react at 80° C. for 3 hours. Thus, polysiloxane (a) was synthesized. This was then adjusted to have a concentration of 50% by mass with methyl isobutyl ketone.

Synthesis of Polydimethylsiloxane-Based Graft Copolymer (a)

The same apparatus as that used for the synthesis of the polysiloxane (a) was charged with 50 parts by mass of toluene, 50 parts by mass of methyl isobutyl ketone, 20 parts by mass of a polydimethylsiloxane-based polymer polymerization initiator (VPS-0501, produced by Wako Pure Chemical Industries, Ltd.), 18 parts by mass of methyl methacrylate, 38 parts by mass of butyl methacrylate, 23 parts by mass of 2-hydroxyethyl methacrylate, 1 part by mass of methacrylic acid, and 0.5 parts by mass of 1-thioglycerin, and then were allowed to react at 180° C. for 8 hours. Thus, polydimethylsiloxane-based block copolymer (a) was obtained. The block copolymer obtained had a solid content of 50% by mass.

Formation of Layer to be Formed from Composition of Raw Material 11

The composition of raw material 11 was applied with a wire bar so that the thickness of the layer after an aging process was 30 μm. The composition was applied to a 100 μm thick polyester base film ("LUMIRROR" U46, produced by Toray Industries, Inc.) with a bar coater so that the film thickness of the layer after drying was 30 μm. After coating, it was heated for 2 minutes at 160° C. by using a hot air dryer (heating process). After that, it was subjected to heating (aging) at 40° C. for 2 days (aging process), thereby affording a laminated film. The obtained results are shown in Table 3.

Raw Material 12

Fifty parts by mass of toluene, 34 parts by mass of isocyanurate-modified type hexamethylene diisocyanate (Takenate D-170N, produced by Takeda Chemical Industries, Ltd.), 57 parts by mass of (poly)caprolactone-modified hydroxyethyl acrylate (PLACCEL FA10, produced by Daicel Chemical Industries, Ltd.), 57 parts by mass of polycaprolactone-modified hydroxyethyl acrylate (PLACCEL FA3, produced by Daicel Chemical Industries, Ltd.), 0.02 parts by mass of dibutyltin laurate, and 0.02 parts by mass of hydroquinone monomethyl ether were mixed and kept at 70° C. for 5 hours. Subsequently, 137.8 parts by mass of toluene was added, affording a urethane acrylate having a solid content of 50% by mass.

Raw Material 13

Fifty parts by mass of 1,3-bisisocyanatemethylcyclohexane, 100 parts by mass of an hydroxyalkyl acrylate, 0.05 parts by mass of dibutyltin laurate, and 2 parts by mass of hydroquinone were added and kept at 70° C. for 3 hours. Subsequently, maturation was carried out at 85° C. for 2 hours, thereby affording a urethane acrylate.

Raw Material 14

Raw material 14 was obtained by dissolving 50 parts by mass of urethane acrylate (U5201, produced by Shin-Nakamura Chemical Co., Ltd.) in 50 parts by mass of MEK at 80° C.

EXAMPLES

Example 1

A radically polymerizable composition having a solid content of 50% by mass was prepared by mixing 50 parts by mass of raw material 1 as a urethane(meth)acrylate (B), 50 parts by mass of raw material 2 as a urethane(meth)acrylate (C), 10 parts of phthalic acid mono hydroxyethyl acrylate (M-5400, produced by Toagosei Co., Ltd.), 10 parts by mass of toluene, and 3 parts by mass of a photoinitiator (Irgacure 184, produced by Ciba Specialty Chemicals). A layer (A) was formed from the resulting composition by the same method as that for formation of the layer (B) or the layer (C), thereby affording a laminated film. (That is, this composition was applied to a 100 µm thick polyester base film ("LUMIRROR" U46, produced by Toray Industries, Inc.) with a bar coater so that the film thickness of the layer after drying was 30 µm. This was allowed to pass through a drying furnace at 80° C. and dried for one minute, and subsequently was cured while being moved at a conveyor speed of 4 m/min in a UV drying furnace with a high-pressure mercury lamp having an output of 400 mW/cm$^2$, thereby affording a laminated film.) The obtained results are shown in Table 4.

Example 2

A radically polymerizable composition having a solid content of 50% by mass was prepared by mixing 50 parts by mass of raw material 3 as a urethane(meth)acrylate (B), 50 parts by mass of raw material 4 as a urethane(meth)acrylate (C), and 3 parts by mass of a photoinitiator (Irgacure 184, produced by Ciba Specialty Chemicals). A layer (A) was formed from the resulting composition by the same method as that for formation of the layer (B) or the layer (C), thereby affording a laminated film. The obtained results are shown in Table 4.

Example 3

A radically polymerizable composition having a solid content of 50% by mass was prepared by mixing 70 parts by mass of raw material 3 as a urethane(meth)acrylate (B), 30 parts by mass of raw material 4 as a urethane(meth)acrylate (C), and 3 parts by mass of a photoinitiator (Irgacure 184, produced by Ciba Specialty Chemicals). A layer (A) was formed from the resulting composition by the same method as that for formation of the layer (B) or the layer (C), thereby affording a laminated film. The obtained results are shown in Table 4.

Example 4

A radically polymerizable composition having a solid content of 50% by mass was prepared by mixing 30 parts by mass of raw material 5 as a urethane(meth)acrylate (B), 70 parts by mass of raw material 4 as a urethane(meth)acrylate (C), and 3 parts by mass of a photoinitiator (Irgacure 184, produced by Ciba Specialty Chemicals). A layer (A) was formed from the resulting composition by the same method as that for formation of the layer (B) or the layer (C), thereby affording a laminated film. The obtained results are shown in Table 4.

Example 5

A radically polymerizable composition having a solid content of 50% by mass was prepared by mixing 50 parts by mass of raw material 5 as a urethane(meth)acrylate (B), 50 parts by mass of raw material 2 as a urethane(meth)acrylate (C), and 3 parts by mass of a photoinitiator (Irgacure 184, produced by Ciba Specialty Chemicals). A layer (A) was formed from the resulting composition by the same method as that for formation of the layer (B) or the layer (C), thereby affording a laminated film. The obtained results are shown in Table 4.

Example 6

A radically polymerizable composition having a solid content of 50% by mass was obtained by blending 50 parts by mass of raw material 1 as a urethane(meth)acrylate (B), 50 parts by mass of raw material 6 as a urethane(meth) acrylate (C), and 3 parts by mass of a photopolymerization initiator (Irgacure 184, produced by Ciba-Geigy).

The ratio of the mass m of the (poly)alkylene glycol segment to the mass n of the (poly)caprolactone segment in this radically polymerizable composition satisfied m=0.46n. A layer (A) was formed from the resulting composition by the same method as that for formation of the layer (B) or the layer (C), thereby affording a laminated film. The obtained results are shown in Table 4.

Examples 7 to 9

Each of radically polymerizable compositions having a solid content of 50% by mass was obtained by blending 50 parts by mass of raw material 1 as a urethane(meth)acrylate (B), 50 parts by mass of each of raw materials 7 to 9, as a urethane(meth)acrylate (C), and 3 parts by mass of a photopolymerization initiator (Irgacure 184, produced by Ciba-Geigy).

The ratios of the mass m of the (poly)alkylene glycol segment to the mass n of the (poly)caprolactone segment in these radically polymerizable compositions satisfied m=0.67n, m=0.88n, and m=1.6n, respectively. A layer (A) was formed from the resulting composition by the same method as that for formation of the layer (B) or the layer (C), thereby affording a laminated film. The obtained results are shown in Table 4.

Example 10

A radically polymerizable composition having a solid content of 50% by mass was obtained by blending 50 parts by mass of raw material 10 as a urethane(meth)acrylate (B), 50 parts by mass of raw material 7 as a urethane(meth) acrylate (C), and 3 parts by mass of a photopolymerization initiator (Irgacure 184, produced by Ciba-Geigy).

The ratio of the mass m of (1) the (poly)alkylene glycol segment to the mass n of (3) the (poly)caprolactone segment in this radically polymerizable composition satisfied m=0.65n. A layer (A) was formed from the resulting composition by the same method as that for formation of the layer (B) or the layer (C), thereby affording a laminated film. The obtained results are shown in Table 4.

Example 11

A radically polymerizable composition having a solid content of 50% by mass was obtained by blending 47 parts by mass of raw material 1 as a urethane(meth)acrylate (B), 47 parts by mass of raw material 7 as a urethane(meth)acrylate (C), 5 parts by mass of a MEK dispersion liquid of silica particles (Spherica Slurry 120, produced by JGC Catalysts and Chemicals Ltd., average particle diameter: 120 nm, $SiO_2$ concentration: 5% by mass), and 3 parts by mass of a photopolymerization initiator (Irgacure 184, produced by Ciba-Geigy).

The ratio of the mass m of (1) the (poly)alkylene glycol segment to the mass n of (3) the (poly)caprolactone segment in this radically polymerizable composition satisfied m=0.67n. A layer (A) was formed from the resulting composition by the same method as that for formation of the layer (B) or the layer (C), thereby affording a laminated film. The obtained results are shown in Table 4.

Example 12

A radically polymerizable composition having a solid content of 50% by mass was obtained by blending 20 parts by mass of raw material 1 as a urethane(meth)acrylate (B), 80 parts by mass of raw material 8 as a urethane(meth)acrylate (C), and 3 parts by mass of a photopolymerization initiator (Irgacure 184, produced by Ciba-Geigy).

The ratio of the mass m of the (poly)alkylene glycol segment to the mass n of the (poly)caprolactone segment in this radically polymerizable composition satisfied m=3.5n. A layer (A) was formed from the resulting composition by the same method as that used for formation of the layer (B) or the layer (C), thereby affording a laminated film. The obtained results are shown in Table 4.

Example 13

A radically polymerizable composition having a solid content of 50% by mass was obtained by blending 20 parts by mass of raw material 1 as a urethane(meth)acrylate (B), 80 parts by mass of raw material 9 as a urethane(meth)acrylate (C), and 3 parts by mass of a photopolymerization initiator (Irgacure 184, produced by Ciba-Geigy).

The ratio of the mass m of the (poly)alkylene glycol segment to the mass n of the (poly)caprolactone segment in this radically polymerizable composition satisfied m=6.3n. A layer (A) was formed from the resulting composition by the same method as that for formation of the layer (B) or the layer (C), thereby affording a laminated film. The obtained results are shown in Table 4.

Example 14

A radically polymerizable composition having a solid content of 50% by mass was obtained by blending 10 parts by mass of raw material 1 as a urethane(meth)acrylate (B), 90 parts by mass of raw material 9 as a urethane(meth)acrylate (C), and 3 parts by mass of a photopolymerization initiator (Irgacure 184, produced by Ciba-Geigy).

The ratio of the mass m of the (poly)alkylene glycol segment to the mass n of the (poly)caprolactone segment in this radically polymerizable composition satisfied m=14n. A layer (A) was formed from the resulting composition by the same method as that for formation of the layer (B) or the layer (C), thereby affording a laminated film. The obtained results are shown in Table 4.

Comparative Example 1

Raw material 11 was obtained by blending (mixing) 75 parts by mass of a polydimethylsiloxane-based block copolymer (a), 10 parts by mass of polysiloxane (a), and 15 parts by mass of a (poly)caprolactone triol having a hydroxy group (PLACCEL 308, produced by Daicel Chemical Industries, Ltd., weight average molecular weight: 850). A thermosetting composition having a solid content of 40% by mass was obtained by adding 100 parts by mass of raw material 1 and 25 parts by mass of an isocyanurate form of hexamethylene diisocyanate (Takenate D-170N, produced by Takeda Chemical Industries, Ltd.), and then further diluting them with methyl ethyl ketone. A layer (A) was formed from the resulting composition by the same method as that for formation of the layer to be formed from the above-described composition of raw material 11, thereby affording a laminated film. The obtained results are shown in Table 5.

Comparative Example 2

A radically polymerizable composition having a solid content of 50% by mass was obtained by blending 100 parts by mass of raw material 1 as a urethane(meth)acrylate (B), and 3 parts by mass of a photopolymerization initiator (Irgacure 184, produced by Ciba-Geigy). A layer (A) was formed from the resulting composition by the same method as that for formation of the layer (B) or the layer (C), thereby affording a laminated film. The obtained results are shown in Table 5.

Comparative Example 3

A radically polymerizable composition having a solid content of 50% by mass was obtained by blending 100 parts by mass of raw material 3 as a urethane(meth)acrylate (B), and 3 parts by mass of a photopolymerization initiator (Irgacure 184, produced by Ciba-Geigy). A layer (A) was formed from the resulting composition by the same method as that for formation of the layer (B) or the layer (C), thereby affording a laminated film. The obtained results are shown in Table 5.

Comparative Example 4

A radically polymerizable composition having a solid content of 50% by mass was prepared by mixing 100 parts by mass of raw material 12 as a urethane(meth)acrylate (B), and 3 parts by mass of a photoinitiator (Irgacure 184, produced by Ciba Specialty Chemicals). A layer (A) was formed from the resulting composition by the same method as that for formation of the layer (B) or the layer (C), thereby affording a laminated film. The obtained results are shown in Table 5.

Comparative Example 5

A radically polymerizable composition having a solid content of 50% by mass was obtained by blending 50 parts by mass of raw material 3 as a urethane(meth)acrylate (B), 50 parts by mass of raw material 1 as a urethane(meth) acrylate (C), and 3 parts by mass of a photopolymerization initiator (Irgacure 184, produced by Ciba-Geigy). A layer (A) was formed from the resulting composition by the same method as that for formation of the layer (B) or the layer (C), thereby affording a laminated film. The obtained results are shown in Table 5.

Comparative Example 6

A radically polymerizable composition having a solid content of 20% by mass was obtained by blending 80 parts by mass of raw material 5 as a urethane(meth)acrylate (B), 20 parts by mass of raw material 4 as a urethane(meth) acrylate (C), and 3 parts by mass of a photopolymerization initiator (Irgacure 184, produced by Ciba-Geigy). A layer (A) was formed from the resulting composition by the same method as that for formation of the layer (B) or the layer (C), thereby affording a laminated film. The obtained results are shown in Table 5.

Comparative Example 7

A radically polymerizable composition having a solid content of 50% by mass was obtained by blending 50 parts by mass of raw material 5 as a urethane(meth)acrylate (B), 50 parts by mass of raw material 3 as a urethane(meth) acrylate (C), and 3 parts by mass of a photopolymerization initiator (Irgacure 184, produced by Ciba-Geigy). A layer (A) was formed from the resulting composition by the same method as that for formation of the layer (B) or the layer (C), thereby affording a laminated film. The obtained results are shown in Table 5.

Comparative Example 8

A radically polymerizable composition having a solid content of 50% by mass was prepared by mixing 100 parts by mass of raw material 13 as a urethane(meth)acrylate (B), and 3 parts by mass of a photoinitiator (Irgacure 184, produced by Ciba Specialty Chemicals). A layer (A) was formed from the resulting composition by the same method as that for formation of the layer (B) or the layer (C), thereby affording a laminated film. The obtained results are shown in Table 5.

Comparative Example 9

A radically polymerizable composition having a solid content of 50% by mass was prepared by mixing 100 parts by mass of raw material 14 as a urethane(meth)acrylate (B), and 3 parts by mass of a photoinitiator (Irgacure 184, produced by Ciba Specialty Chemicals). A layer (A) was formed from the resulting composition by the same method as that for formation of the layer (B) or the layer (C), thereby affording a laminated film. The obtained results are shown in Table 5.

Comparative Example 10

A radically polymerizable composition having a solid content of 50% by mass was obtained by blending 50 parts by mass of raw material 5 as a urethane(meth)acrylate (B), 50 parts by mass of raw material 14 as a urethane(meth) acrylate (C), and 3 parts by mass of a photopolymerization initiator (Irgacure 184, produced by Ciba-Geigy). A layer (A) was formed from the resulting composition by the same method as that for formation of the layer (B) or the layer (C), thereby affording a laminated film. The obtained results are shown in Table 5.

TABLE 1

| | | Raw materials | | | | |
|---|---|---|---|---|---|---|
| | | Raw material 1 | Raw material 3 | Raw material 5 | Raw material 10 | Raw material 12 |
| Dissolved cosmetic concentration | % by mass | 1.8 | 2.6 | 3.6 | 1.7 | 2.3 |
| Oleic acid mass increase ratio | % by mass | 1.5 | 3.5 | 41.5 | 2.3 | 3.1 |
| Maximum displacement amount | μm | 1.5 | 1.8 | 1.6 | 1.4 | 1.7 |
| Creep displacement amount | μm | 0.42 | 0.56 | 0.62 | 0.4 | 0.47 |

TABLE 2

| | | Raw materials | | | | | | | |
|---|---|---|---|---|---|---|---|---|---|
| | | Raw material 2 | Raw material 4 | Raw material 6 | Raw material 7 | Raw material 8 | Raw material 9 | Raw material 13 | Raw material 14 |
| Dissolved cosmetic concentration | % by mass | 1.3 | 1.7 | 0.7 | 1.1 | 1.5 | 2.2 | 0.4 | 0.4 |
| Oleic acid mass increase ratio | % by mass | 1.2 | 1.1 | 0.5 | 1.2 | 2 | 2.8 | 0.5 | 0.5 |
| Maximum displacement amount | μm | 1.0 | 1.5 | 0.9 | 1.4 | 1.4 | 2.0 | 0.26 | 0.47 |

TABLE 2-continued

| | | Raw materials | | | | | | | |
|---|---|---|---|---|---|---|---|---|---|
| | | Raw material 2 | Raw material 4 | Raw material 6 | Raw material 7 | Raw material 8 | Raw material 9 | Raw material 13 | Raw material 14 |
| Creep displacement amount | μm | 0.15 | 0.35 | 0.08 | 0.13 | 0.2 | 0.35 | 0.03 | 0.16 |

TABLE 3

| Raw material | | Raw material 11 |
|---|---|---|
| Dissolved cosmetic concentration | % by mass | 4.2 |
| Oleic acid mass increase ratio | % by mass | 13 |
| Maximum displacement amount | μm | 1.8 |
| Creep displacement amount | μm | 0.38 |

TABLE 4

| | | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|---|
| Dissolved cosmetic concentration | % by mass | 1.6 | 2.2 | 2.3 | 2.3 | 2.5 | 1.0 | 1.3 | 1.6 | 2.1 | 1.3 | 1.3 | 2.0 | 2.1 | 2.4 |
| Oleic acid mass increase ratio | % by mass | 1.8 | 2.5 | 3.6 | 9.3 | 5.1 | 1.3 | 1.8 | 3.5 | 2.8 | 3.2 | 1.8 | 2.5 | 3.3 | 3.5 |
| Maximum displacement amount | μm | 1.3 | 1.7 | 1.7 | 1.5 | 1.3 | 1.2 | 1.5 | 1.5 | 1.8 | 1.4 | 1.5 | 1.4 | 1.9 | 2.0 |
| Creep displacement amount | μm | 0.29 | 0.46 | 0.50 | 0.43 | 0.39 | 0.28 | 0.35 | 0.37 | 0.40 | 0.33 | 0.35 | 0.24 | 0.36 | 0.35 |
| Permanent displacement amount | μm | 0.53 | 0.59 | 0.61 | 0.62 | 0.54 | 0.48 | 0.56 | 0.60 | 0.63 | 0.57 | 0.55 | 0.35 | 0.37 | 0.33 |
| Self-healing property | | ○ | ○ | ● | ● | ⊙ | ○ | ⊙ | ⊙ | ○ | ⊙ | ⊙ | ● | ● | ● |
| Cosmetics resistance | | ○ | ● | ● | Δ | Δ | ○ | ○ | ● | ● | ○ | ○ | ○ | ● | ● |
| Dynamic coefficient of friction (μk) | | 0.35 | 0.35 | 0.37 | 0.5 | 0.47 | 0.32 | 0.34 | 0.35 | 0.38 | 0.3 | 0.26 | 0.38 | 0.41 | 0.42 |
| Difference of (dynamic coefficient of friction)-(static coefficient of friction) | | 0.14 | 0.16 | 0.17 | 0.12 | 0.06 | 0.19 | 0.18 | 0.16 | 0.11 | 0.01 | 0.04 | 0.12 | 0.13 | 0.1 |
| Elongation at break (%) | | 35 | 55 | 60 | 80 | 70 | 40 | 50 | 50 | 55 | 50 | 60 | 45 | 60 | 60 |

TABLE 5

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| Dissolved cosmetic concentration | % by mass | 4.2 | 1.8 | 2.6 | 2.3 | 2.2 | 3.7 | 3.1 | 0.4 | 0.40 | 1.8 |

TABLE 5-continued

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| Oleic acid mass increase ratio | % by mass | 13 | 1.5 | 3.5 | 3.1 | 3.3 | 20 | 14 | 0.5 | 0.5 | 13 |
| Maximum displacement amount | μm | 1.8 | 1.5 | 1.8 | 1.7 | 1.7 | 1.58 | 1.7 | 0.26 | 0.47 | 0.9 |
| Creep displacement amount | μm | 0.38 | 0.42 | 0.56 | 0.47 | 0.49 | 0.57 | 0.59 | 0.03 | 0.16 | 0.39 |
| Permanent displacement amount | μm | 0.66 | 0.73 | 1.26 | 0.71 | 0.68 | 0.89 | 0.91 | 0.05 | 0.33 | 0.56 |
| Self-healing property |  | ⊙ | X | X | X | X | X | X | X | X | X |
| Cosmetics resistance |  | X | ◯ | ● | ● | ● | X | X | ◯ | ◯ | X |
| Dynamic coefficient of friction (μk) |  | 0.14 | 0.54 | 0.32 | 0.37 | 0.35 | 0.42 | 0.39 | 0.49 | 0.52 | 0.46 |
| Difference of (dynamic coefficient of friction)-(static coefficient of friction) |  | 0.01 | 0.3 | 0.18 | 0.18 | 0.15 | 0.26 | 0.23 | 0.14 | 0.36 | 0.25 |
| Elongation at break (%) |  | 100< | 100< | 50 | 50 | 100< | 100< | 70 | 5 | 100< | 80 |

The invention claimed is:

1. A laminated film having a layer (A) on at least one side of a base film, wherein the layer (A) is obtained by curing a composition comprising a urethane (meth)acrylate (B), a urethane (meth)acrylate (C), and a resin; the urethane (meth)acrylate (B) has at least a (poly)caprolactone segment, the urethane (meth)acrylate (C) has at least a (poly)alkylene glycol segment, and the resin has a (poly)caprolactone segment, a urethane bond, and a (poly)siloxane segment and/or a polydimethylsiloxane segment and, in measurement using a micro hardness tester, a maximum displacement amount in a thickness direction of the layer (A) is 1.0 to 3.0 μm and a creep displacement amount in the thickness direction of the layer (A) is 0.2 to 0.5 μm when a load of 0.5 mN is applied for 10 seconds, and a permanent displacement amount in the thickness direction of the layer (A) is 0.3 to 0.65 μm when the load is release to 0 mN.

2. The laminated film according to claim 1, wherein the layer (A) has a degree of elongation at break of 50% or more.

3. The laminated film according to claim 2, wherein a dissolved cosmetic concentration of the layer (A) of 2.9% by mass or less is attained by applying the cosmetic to the surface of the layer (A) and then holding it in an atmosphere of 60° C. for 6 hours.

4. The laminated film according to claim 2, wherein a mass increase ratio of the layer (A) of 10% by mass or less is attained by applying oleic acid to the surface of the layer (A) and then holding it in an atmosphere of 60° C. for 1 hour.

5. The laminated film according to claim 1, wherein a dissolved cosmetic concentration of the layer (A) of 2.9% by mass or less is attained by applying the cosmetic to the surface of the layer (A) and then holding it in an atmosphere of 60° C. for 6 hours.

6. The laminated film according to claim 5, wherein a mass increase ratio of the layer (A) of 10% by mass or less is attained by applying oleic acid to the surface of the layer (A) and then holding it in an atmosphere of 60° C. for 1 hour.

7. The laminated film according to claim 1, wherein a mass increase ratio of the layer (A) of 10% by mass or less is attained by applying oleic acid to the surface of the layer (A) and then holding it in an atmosphere of 60° C. for 1 hour.

8. The laminated film according to claim 1, wherein the layer (A) has a dynamic coefficient of friction ($\mu k$) of 0.45 or less.

9. The laminated film according to claim 1, wherein the layer (A) has a difference ($\mu s-\mu k$) between a static coefficient of friction ($\mu s$) and a dynamic coefficient of friction ($\mu k$), of 0.05 or less.

* * * * *